Patented Sept. 22, 1942

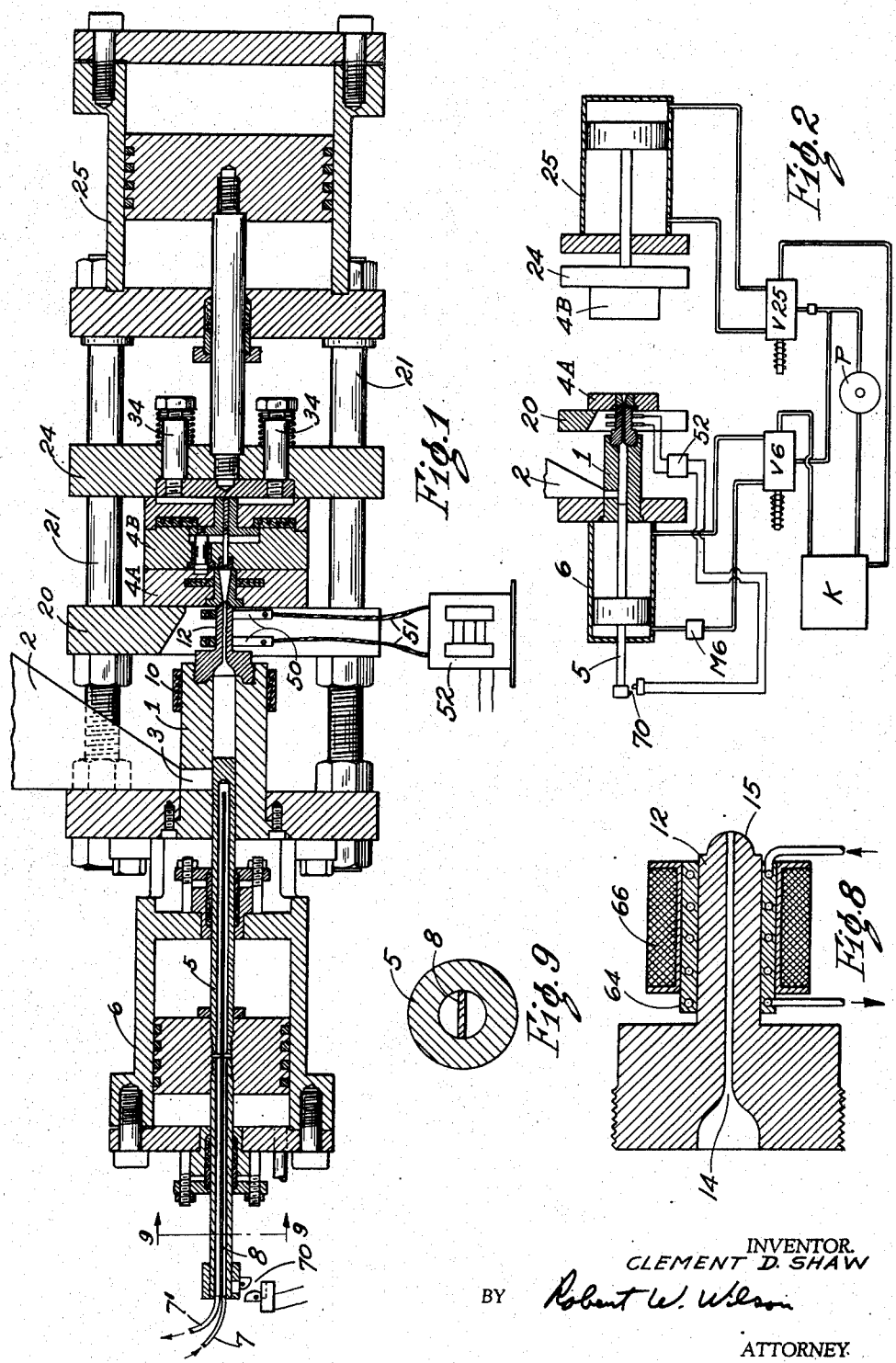
Sept. 22, 1942.  C. D. SHAW  2,296,295
MOLDING METHOD AND APPARATUS
Filed Dec. 8, 1938  2 Sheets-Sheet 1
INVENTOR.
CLEMENT D. SHAW
BY Robert W. Wilson
ATTORNEY.

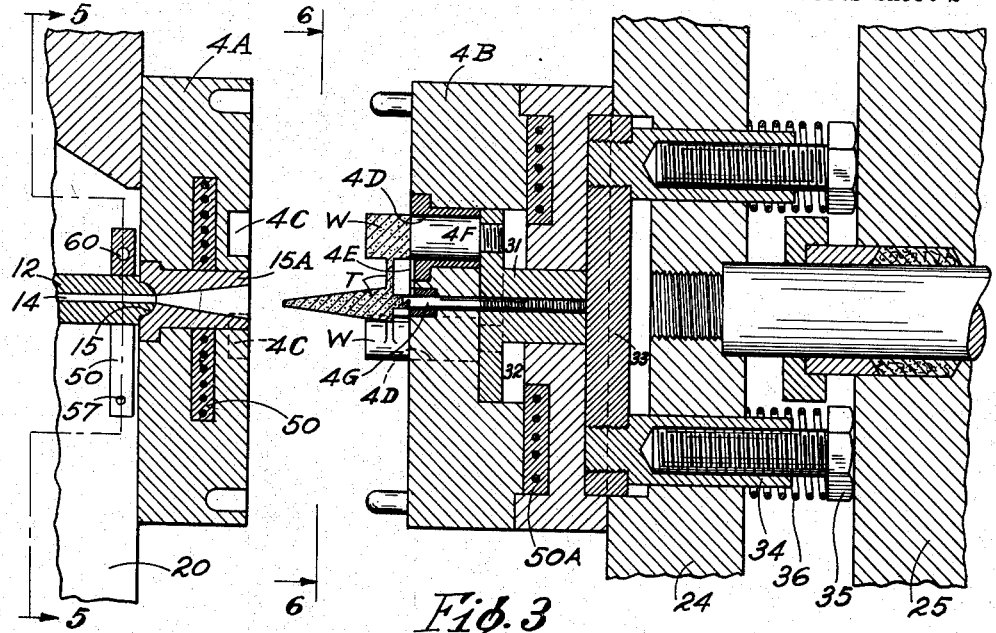
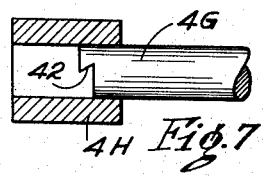
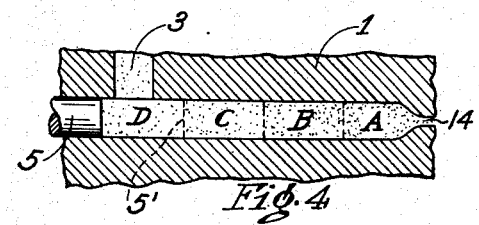
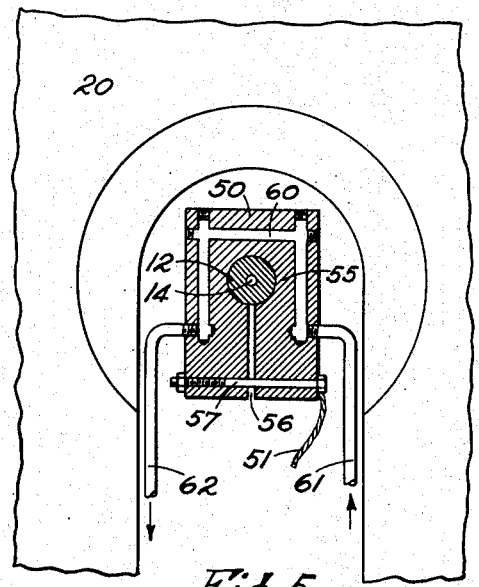
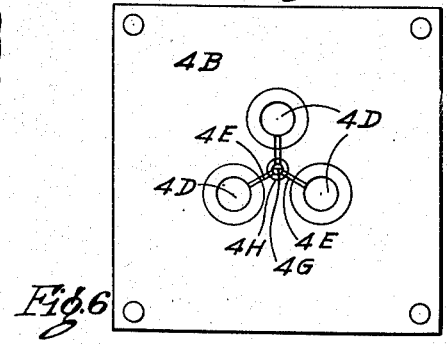

2,296,295

UNITED STATES PATENT OFFICE 2,296,295

MOLDING METHOD AND APPARATUS

Clement D. Shaw, Orchard Lake, Mich., assignor to William B. Hoey, Franklin, Mich., and Everett D. McCurdy, Cleveland, Ohio, as trustees Application December 8, 1938, Serial No. 244,595

22 Claims. (Cl. 18—30)

This invention relates to a method and apparatus for the manufacture of plastic articles and is particularly directed to the molding of thermosetting materials by an injection process which may be automatic if desired. At the present time more or less satisfactory methods are known to mold thermoplastic and thermosetting materials by processes wherein a supply of material, usually a single charge, is forced from a cylinder by pressure into a mold, one charge either making one molded article or making several in rapid succession, according to the relative sizes of cylinder and mold. So far as I am aware all such processes require the charge to be used rapidly, if working thermosetting materials; and for many materials also require that the charge be completely ejected (i. e., the cylinder emptied) before the cylinder can be reloaded. It has not proved commercially feasible to mold thermosetting plastics by processes wherein a considerable supply of the material is subjected to pressure intermittently, each time forcing out a sufficient amount of material to fill the mold, because phenolic condensates, urea-formaldehydes, and other types of synthetic resins which do not soften under heat after they have become finally set, quickly polymerize in the cylinder and passages, thereby blocking the operation. In other words, it has not been feasible to keep a quantity of such material available for successive discharges while maintaining it in plastic phase, nor to leave material in a supply cylinder for considerable times, because no practicable way has been known to prevent it from undergoing deleterious physical or chemical changes, either by partially or completely setting, or by decomposing. Neither is it known to make such an operation continuous by replenishing the supply in the cylinder incidentally to ejecting.

This invention is directed to the avoidance of the foregoing difficulties and to supplying the present deficiencies of the art.

A preferred form of machine suitable for the carrying out of my process is illustrated and described here, it being understood, however, that the principles of the process are susceptible of being applied by other apparatus and also that the apparatus, although particularly directed to the herein described process, is intended to be protected in such applications as it may have to othei processes.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In the accompanying drawings:

Fig. 1 is a central longitudinal section through a molding apparatus adapted to carry out my invention, shown with mold closed;

Fig. 2 is a diagrammatic view, partly in longitudinal section, illustrating operating and control mechanisms;

Fig. 3 is an enlarged detail on the same plane as Fig. 1, but of the mold portion only, with mold open;

Fig. 4 is a diagrammatic section through the pressure cylinder, illustrating the mode of operation;

Fig. 5 is a detail on plane 5—5, Fig. 3, illustrating an electrode detail;

Fig. 6 is a face view of the movable die half, taken on the plane 6—6 of Fig. 3;

Fig. 7 is an enlarged fragmentary detail from Fig. 1, taken on the same plane;

Fig. 8 is another enlarged fragmentary detail, taken on the same plane as Fig. 1, but showing an alternative construction; and Fig. 9 is an enlarged section on the plane 9—9 Fig. 1, illustrating a piston cooling detail.

General mechanism

Throughout the description such terms as "front" and "rear" are used in the sense of direction of flow of material; the charge is considered as being put in at the rear and going out at the front, as in a breech-loading gun.

Referring particularly to Fig. 1, the present preferred form of my apparatus comprises a charging cylinder 1 of thick wall and small bore, suitably supplied with material as from a hopper 2 through a side port 3, the hopper being representative of any source of supply. The bore of the cylinder forward of the port 3 is of capacity sufficient for one or more fillings of the molding space. The present illustration is of mold cavities 4C, 4D, the volume of which, with runners and sprues, is about one-fourth that of the cylinder. The complementary elements of the mold cavities are respectively in a stationary mold block 4A and movable mold block 4B. A plunger 5, operated by suitable mechanism, of which the oil pressure cylinder 6 is an example, travels forward at each mold-filling cycle a sufficient distance to force a charge of plastic through the restricted bore of a nozzle 12 into the mold cavities 4, forward travel of the plunger 5 being stopped by resistance of the material when the molding spaces are filled. After each stroke the plunger moves back, as in Fig. 4, clearing the port 3 and allowing a fresh charge of material to fall into the cylinder in advance of the plunger head, equal to the volume which has been ejected by the previous stroke.

Thus the operation is that a stream of the plastic is continually being moved forward through the charging cylinder step-by-step, as shown in Fig. 4, where A represents the charge which will be expelled on the next stroke, B and C successive charges, and D the charge last received. The dotted line 5', dividing C from D, represents the extreme forward position the front face of plunger 5 assumes in expelling each charge in the particular operation illustrated. This position 5' obviously depends on the volume of material required to fill the molding spaces. Ordinarily the total volume of material in the cylinder will be equal to from 3 to 6 charges of the mold, although this is largely a matter of convenience. The plunger 5 is water cooled, as by circulation through a central bore in the plunger, Figs. 1 and 9, from inlet 7 around baffle 8 to outlet 7'. The front (discharge) end of cylinder 1 is heated, as by resistance coil 10. Consequently the new supply of plastic, usually in the form of powder, chips, or the like, coming in cold at the rear (charge D, Fig. 4) is gradually warmed up, and has attained the full temperature of the forward end of the cylinder, and a pasty fluent state, when it reaches position A, ready to be ejected through the nozzle 12. The forward end of the cylinder bore converges into the restricted orifice 14 of nozzle 12, this orifice having a diameter on the order of .090 to .1250 inch. The nozzle 12 is preferably finished in a hemispherical nose 15 which accurately fits a corresponding recess in a hardened insert 15A in the stationary mold plate 4A. A flaring gate leads through insert 15A into the molding space.

The particular mold herein selected for illustration is a simple type for forming several cylindrical objects or work pieces W, three in the present instance, and consists of three identical front cavities, 4C in the block 4A, and complementary rear cavities 4D in the movable block 4B, all at 120° intervals, and with parting line at half the cavity depth. The cavities are connected by runners 4E. In the particular mold shown the rear cavities 4D are bushings inserted in the block 4B, and the bottoms are the knock-out pins 4F, but obviously the mold in actual use will be shaped appropriately to the intended product. The front mold 4A is carried on front platen 20 which in turn is supported by the strain rods 21 of the press assembly and may be moved for insertion of nozzles of different length, and so on, but is stationary during production runs. The rear mold plate 4B is fast to rear platen 24, movable by a piston and cylinder 25, or other appropriate mechanism. The total pressure applied to the piston of 25 is greater than that applied to the plunger 5, so that, as previously mentioned, filling of the mold spaces stops the plunger without causing the mold to open. A suitable knock-out mechanism, with related features, is shown in detail in Figs. 1 and 3, consisting of the knock-out pins 4F which in the present instance are the mold bottoms, and a smaller central pin 4G, all fast to a headed stud 31 movable in the space 32 by means of yoke 33 and pins 34, all as usual in knock-out mechanisms. The knock-out stroke is adjustable by cap screws 35 and retracted by springs 36. As best seen in Fig. 7, the central pin, or sprue puller, 4G moves in and out of a bushing 4H in mold block 4B opposite the nozzle orifice 14, similarly to the action of the pins 4F. The sprue puller 4G is undercut at its outer end to provide a hook 42 to engage the sprue material and help break the same from the work pieces W, as further explained under the heading "Operation," below.

Temperature control

The temperature control in various parts of the apparatus is a matter of importance, and will now be described, reserving explanation of the purposes of such control to the description of the operation.

The cylinder 1 is heated at its ejection end by suitable apparatus, herein conveniently illustrated as the resistance coil 10 already mentioned, and such thermal insulation as may be desirable can be applied but none is shown herein. The plunger 5 is appropriately fitted for the circulation of cooling fluid as already described. The nozzle 12 is equipped for both heating and cooling, as shown best in Figs. 1, 5 and 8 and described below. The mold halves 4A and 4B are also heated, as by resistance elements 50A, Figs. 1 and 3.

The preferred arrangements for heating and cooling the nozzle 12, shown in Figs. 1, 3 and 5, comprise resistance heating and water cooling, although other methods of heating and cooling are not excluded from the invention. For example, Fig. 8 illustrates induction heating. Electrodes 50, which in the present illustrative embodiment are of identical construction, are clamped upon the nozzle 12 near its ends, and are connected by cables 51 to the secondary of a transformer 52 which supplies a current of high amperage and low voltage, similar to that used in spot welding, thus heating the nozzle by resistance. The preferred electrode construction comprises a solid copper block, shown in Fig. 5 in section transverse to the nozzle, bored through as at 55 to fit snugly upon the nozzle 12 and split at 56 from such bore to one edge, so that it can be clamped by a bolt 57. The electrode is internally channeled by a U-shaped passage 60 for circulation of cooling water or other suitable fluid, with inlet connection 61 and outlet connection 62. The cooling water is best allowed to run constantly.

A convenient arrangement for induction heating is that of Fig. 8, wherein the nozzle 12 is jacketed as at 64 for constant circulation of cooling fluid, and the jacket is in turn surrounded by an induction coil 66.

Operation

In the usual operation the cylinder 1 is charged with the thermosetting potentially plastic material in non-plasticized condition, ordinarily powder, grains, chips or other convenient form, and the temperature of the forward (ejection) end is maintained on the order of from 150° to 190° F. by the heating element 10. The temperature maintained depends upon the characteristics of the molding material used and the pressure in pounds per square inch applied thereto, the quantity ejected at each shot, flow distance, size of article to be molded, and other factors, all as may be most appropriate. The plunger 5 is arranged to deliver pressures on the order of from 30,000 to 90,000 pounds per square inch to eject the material.

The charge is converted by the heat and pressure into a mass which will flow under pressure. No detrimental reaction takes place in the cylinder because the temperature maintained is kept in too low a range to cause any appreciable heat hardening.

The circulation of cooling fluid in the plunger 5 keeps the material immediately against the plunger face in a condition of separate particles in more or less granular condition, not plasticized, so that the material does not creep around and build up on the sides of the plunger. That is, this coolness prevents such material, with which the plunger end is constantly in contact, from becoming plastic and leaking between the plunger and the cylinder wall, which would cause the plunger to bind.

The nozzle 12 is heated while ejection is in progress to a temperature which may be anywhere from 400° to 1200° F. according to such considerations as the exact composition of the plastic being worked, the amount of filler it contains (if any), the size and complexity of the mold, and similar factors. Although the charge being ejected is in a fine stream, its speed of movement is so great that it has not become heated up to nozzle temperature when it enters the molding spaces. The preferred heating method is by generation of heat in the nozzle itself, just before and during the ejection stroke of the plunger 5, which is of momentary duration. The constantly circulating cooling water prevents transfer of heat from the nozzle either to the cylinder 1 or to the mold, both of which are held at lower temperatures than are intermittently applied to the nozzle. This cooling also enables the material to be solidified in the nozzle channel 14 when desired. It is believed that such solidification is without polymerization, but whatever the explanation may be, in practice the material can again be made to flow under heat and pressure even after holding the amount which is in the nozzle so solidified for several hours.

The temperature maintained in the mold will also be controlled in consonance with factors similar to those which determine the temperature to be used in the nozzle. Normally the mold temperature will be on the order of from 300° to 325° F., although for certain types of work temperatures of 400° F. or more may be employed. The mold temperature is somewhat higher than that which the material being forced into the mold has reached. Such higher temperatures would cause blistering or premature setting of the plastic in ordinary practice, but due to the conditions of operation taught by my invention, it is possible to run the mold hotter, without injuring the material, than has hitherto been possible either with transfer molds or with compression molds.

The time, i. e., speed, of ejection by movement of the plunger 5 is determined by the same factors as govern the nozzle temperature, such factors including the quantity of material ejected in each shot, characteristics of the material, flow distance, etc.

Definite controls for speed of the ejecting stroke and for heating the nozzle are coordinated both as to the heating elements and as to the plunger travel. These controls may be of the thermionic type, such as used in resistance spot welding apparatus, or limit switches, or other suitable devices, as indicated in purely diagrammatic style by switch mechanism 70, Figs. 1 and 2. The effect is that the nozzle passage 14 is heated and the amount of material necessary to fill the molding spaces is ejected through the heated passage in a very thin fast-moving stream and at the same time subjected to a more intense heat than it could stand for any substantial period, but inasmuch as it is subjected to such heat only during a period which, except possibly for filling very large molds, is on the order of fractions of a second, no deleterious effects occur. The ejection is sufficiently rapid to be loosely termed "shooting," speeds on the order of 100 to 150 feet per minute being contemplated, although obviously the optimum speed will be dependent upon such factors as the temperature, the composition of the material, the length of the passage, and the amount of material being passed in each shot.

The charge is thoroughly homogenized in passing through the nozzle and at the same time heated above the temperature it reached in cylinder 1, but probably enters the mold at somewhat less than the mold temperature. Thus the material carries with it into the mold cavity a heat load sufficient so that the entire quantity of the ejection shot (except sometimes a slug from the nozzle which is specially disposed of) is in fluent phase and the mold is filled with this homogeneous fluent mass, with no precooling or partial polymerization of any portions. The result is that striation, case hardening, precuring, presence of solidified inclusions, and so on, are avoided. Although the scientific principle and detailed reaction within the material have not been thoroughly studied and determined, it is believed (putting forward this hypothesis without prejudice) that the heat imparted in the nozzle is largely absorbed in a change of microstructure, or some analogous change of condition of the material passing through, rather than in a rise of temperature; in other words, the heat imparted becomes latent. It is thus believed that the effect is somewhat similar to that which occurs at any of the Ac critical points in heating steel, and that the plastic is delivered to the mold and there cured in a condition comparable to that which obtains when steel is cooled in the austenitic phase.

It has been mentioned that a slug may form in the ejection orifice. Since such slug is of material not polymerized or at least not polymerized to any appreciable degree, it will be partly resolved to plastic state when the heat is turned on nozzle 12. However, some material may stay in solid form, and it is to receive this material that the pin 4G is sunk, when the mold is closed, considerably below the face of the bushing 4H. This slug is joined onto the sprue and runner waste T, Fig. 3, and caught by the hook 42 so that it tends to break away from the work pieces W at knock-out.

An example of suitable operating mechanism for the machine of Fig. 1 is shown in Fig. 2 wherein pressure for actuating the cylinders 6 and 25 is supplied by a pump P, drawing upon a tank K and appropriately admitted to and released from the cylinders by valves V6 and V25, respectively. The pump will constantly operate during the operation of the machine, and the valves return the oil or other liquid through by-passes to tank K when pressure is not being admitted to the cylinders. A metering valve M6 may be employed to govern the pressure applied to the forward movement of the plunger 5. The switch mechanism 70 cuts in the transformer 52 at the proper time with relation to the ejecting stroke, ordinarily very slightly before such stroke begins, and cuts it out as the stroke ends, but does not cut it in on the return stroke of the plunger. It will be understood that the spacing of parts and other details of the showing of 70 in Figs. 1 and 2 are not proportionate to any time intervals, but merely represent graphically that there is appropriate coordination of control between the heating of the nozzle and the movement of the plunger.

Other modes of applying the principle of my invention may be employed instead of the one explained, change being made as regards the means and steps herein disclosed, provided those stated by any of the following claims or the equivalent of such stated means be employed.

I therefore particularly point out and distinctly claim as my invention:

1. A process of molding thermosetting plastic material which comprises plasticizing such material under heat and pressure and shooting said material into a mold through a nozzle hotter than the mold, and completely filling said mold before any portion of such material reaches an irreversible reaction point.

2. The process of molding thermosetting plastic material which comprises plasticizing said material, applying pressure to said material and forcing it to flow in a rapidly moving stream of small cross-sectional area into a heated mold, subjecting said material while flowing in said stream to temperature substantially higher than mold temperature, filling said mold before such material reaches an irreversible reaction point, and thereafter curing said material in said mold.

3. A process of molding infusibly thermosetting plastic which comprises plasticizing said material by application of heat and pressure, said heat and pressure being adjusted to plasticize said material without detrimental polymerization of material during plasticizing stage, passing said material rapidly through a zone wherein the temperature is increased above plasticizing temperature and thence into a mold of lower temperature than said zone, but said mold being at least at polymerization temperature, said zone being heated only during passage of material therethrough, and said material completely filling said mold before any permanent and effective polymerization has taken place.

4. The method of molding thermosetting synthetic resin which comprises plasticizing a quantity of said material without substantial polymerization, causing said material to move at high speed in a small stream into a mold, heating said material while moving in said small stream and subjecting the same to a temperature substantially in excess of mold temperature, maintaining the velocity of said stream while subjecting the material to said temperature, and filling said mold before any substantial change has had time to occur in said charge which would interfere with the molding and curing thereof.

5. A method of molding thermosetting plastic which comprises plasticizing material at temperatures and pressures will will not cause detrimental polymerization, followed by squirting said material at high speed into a mold through a nozzle hotter than the mold thereby rapidly and completely filling said mold, said mold being at a temperature to cause complete polymerization, but the speed of filling said mold being such that filling is completed before such polymerization takes place, whereby disturbance of the internal structure of the material while in such mold is avoided.

6. The method of molding plastic material which consists in plasticizing successive charges of such material, applying pressure successively to such material and thereby injecting successive charges each in a rapidly moving stream of small cross-sectional area into a heated curing mold, subjecting each charge of such material while it is moving in such stream before entering the mold to a temperature in excess of mold temperature, and successively filling said mold with each charge before any substantial change has had time to occur in said charge which would interfere with the molding and curing thereof.

7. A process of molding thermosetting plastic material which comprises plasticizing said material under heat and pressure and shooting said material into a mold through a nozzle hotter than the mold, completely filling said mold before any portion of such material reaches an irreversible reaction point, and reducing the temperature of said nozzle after each shot to congeal the material therein.

8. The method of molding thermosetting synthetic resin which comprises plasticizing a quantity of said material without substantial polymerization, causing said material to move at high speed in a small stream into a mold, heating said material while moving in said small stream and subjecting the same to a temperature substantially in excess of mold temperature, maintaining the velocity of said stream while subjecting the material to said temperature and while filling said mold, the stream coming to rest upon completion of the filling of the mold, and stopping the heating of said stream in timed relation to the reduction in velocity thereof, and maintaining a reduced temperature therein lower than mold temperature while said stream is quiescent.

9. That method of molding plastic material by injection of mold-filling charges from a cylinder through a passage into a mold which comprises maintaining substantially constant temperatures on said cylinder and on said mold adapted respectively to plasticize the material in said cylinder and to cure the material in said mold, applying to said passage during movements of charges therethrough a temperature substantially above that on said mold, and applying to said passage between movements of charges therethrough a temperature substantially below that on said cylinder.

10. That method of molding plastic material by injection of mold-filling charges from a cylinder through a passage into a mold by forceful movement of a piston into said cylinder opposite said passage which comprises maintaining substantially constant temperatures on said cylinder and on said mold adapted respectively to plasticize the material in said cylinder and to cure the material in said mold, maintaining a temperature on said piston substantially less than maintained on said cylinder, applying to said passage during movement of a charge therethrough a temperature substantially above that on said mold and applying to said passage between movements of charges therethrough a temperature substantially below that on said cylinder.

11. The method of molding thermosetting plastic materials which consists in warming a mass of such material in a chamber to a state of plasticity, and successively ejecting plastic charges from said chamber and adding substantially equal charges of raw material thereto, conveying said ejected charges into a mold while maintaining said mold at a temperature sufficient to cure the charges of material received therein, successively receiving said charges in said mold, holding the same therein during a curing period of time and removing said molded and cured charges therefrom, conveying said successive charges from said chamber to said mold through a conduit providing a fluid tight connection therebetween at least during the period of said delivery, alternately and successively applying heat to said conduit while conveying said material therethrough and taking heat from said conduit in synchronized relation to the cessation of movement of said charges from said chamber to said mold.

12. A method of molding thermosetting synthetic plastic material which comprises pre-plasticizing the same without polymerization by adding non-plasticized charges of said material step-by-step in a relatively cool zone at the rear of a pressure chamber and moving said charges forward step-by-step into a relatively hot zone near the discharge end of said chamber, discharging said material through a closely restricted channel at said discharge end while heating said channel to a temperature much in excess of that of said hot zone, thereby flowing said material into a mold at high speed in a minute stream in homogeneous fluid condition, thereby completely filling said mold before any change has had time to occur in the mold charge, and immediately applying cooling action at a location between said hot zone and said channel and at a time between successive injections, thereby preventing heat transfer between said channel and said zone.

13. A method of molding thermosetting synthetic resins which comprises admitting successive charges of said resin to a pressure chamber having a capacity of a plurality of such charges and being cooler at admission end than at discharge end, pushing such charges step-by-step through such chamber by successive pressure impulses, ejecting the oldest such charge at high speed through an elongated passage of minute transverse area, said passage being heated to a temperature substantially above the highest in said pressure chamber, into a mold which is heated to a temperature above the highest in said pressure chamber but below that of said passage, said method also including cooling said passage between steps.

14. Molding apparatus comprising a heated pressure cylinder with cooled piston therein, a heated mold, a nozzle having a restricted passage therethrough connecting said cylinder with the cavities of said mold as a closed system, heating and cooling means for said nozzle, and timing controls for causing said heating means to heat said nozzle on the forward stroke only of said piston.

15. Molding apparatus comprising a heated pressure cylinder, a piston therein, a heated mold, a nozzle having restricted passage therethrough connecting said cylinder with the cavities of said mold as a closed system, heating and cooling means for said nozzle, and means for causing said heating means to heat said nozzle on or about the forward stroke only of said piston.

16. Molding apparatus comprising in combination, a pressure chamber, a mold, a nozzle for conducting material from said chamber to said mold, a piston acting in said chamber for forcing material from said chamber through said nozzle into said mold, means for warming the material in said chamber to a condition of plasticity at least adjacent said nozzle, means for heating said mold to facilitate the curing of material injected thereinto through said nozzle, means associated with said nozzle for subjecting said material in said nozzle to temperatures substantially in excess of mold temperature at least during the time when material is being injected into said mold through said nozzle whereby to reduce the curing time in said mold, and means for causing said heating means to heat said nozzle on the forward stroke only of said piston.

17. In a plastic molding apparatus a supply cylinder, a heated mold, a nozzle connecting said cylinder and said mold, means for successively forcing mold filling charges of plastic from the cylinder through the nozzle to said mold, means associated with said nozzle for heating the same to temperatures in excess of mold temperature only while plastic is about to be and is being forced therethrough, and means for cooling said nozzle to prevent substantial polymerization therein when the plastic therein is not being moved therethrough.

18. The combination according to claim 17 in which said cooling means continuously and substantially constantly tends to abstract heat from said nozzle, and in which said heating means is adapted to apply heat much more rapidly than the rate at which said cooling means abstracts heat.

19. The combination according to claim 17 in which said cooling means substantially continuously tends to abstract heat from the nozzle at least adjacent said cylinder, and in which said heating means supplies heat greatly in excess of the rate at which said cooling means abstracts heat.

20. In a plastic molding apparatus a supply cylinder, a mold, a nozzle connecting said cylinder and said mold, means for forcing successive charges of plastic from said cylinder through said nozzle into said mold, means associated with said nozzle for heating and for cooling said nozzle, said last-named means comprising electrodes spaced apart on said nozzle and channels for cooling fluid associated with said electrodes, and means for supplying electric current to said electrodes only while a charge is about to be and is being forced through said nozzle.

21. In a molding machine the combination of a pressure chamber, a mold and a nozzle for conducting material from said chamber to said mold, means for feeding material into said chamber in successive mold filling charges and for successively exerting pressure thereupon tending to eject charges of said material through said nozzle, means for warming a charge of said material in said chamber to a condition of plasticity adjacent said nozzle, means for heating said mold to facilitate the curing of each charge of material injected thereinto through said nozzle, said nozzle being constructed to have a minimum heat capacity consistent with its required strength, and means associated with said nozzle for rapidly applying heat thereto only while a charge is being injected therethrough and for rapidly subtracting heat therefrom thereafter.

22. In apparatus of the character described, in combination, a cylinder, a loading port adjacent one end of said cylinder and a discharge nozzle of restricted bore at the other end of said cylinder, a piston in said cylinder movable rearwardly to uncover said loading port and forwardly to eject material through said nozzle, cooling means for said nozzle, heating means for said nozzle, means operably synchronized with movement of said piston in the ejecting direction to energize said heating means during the ejecting movement, only, of said piston, and a mold in pressure-tight relation to said cylinder and said nozzle.

CLEMENT D. SHAW.